(12) United States Patent
Hoshino

(10) Patent No.: US 6,454,483 B1
(45) Date of Patent: Sep. 24, 2002

(54) PIPE LINK WITH EXPANDABLE BUSHING

(75) Inventor: Yoshihiro Hoshino, Nagoya (JP)

(73) Assignee: Hoshino Gakki Kabushiki Kaisha (JP)

( * ) Notice: Subject to any disclaimer, the term of this patent is extended or adjusted under 35 U.S.C. 154(b) by 0 days.

(21) Appl. No.: 09/766,923

(22) Filed: Jan. 22, 2001

(30) Foreign Application Priority Data

Sep. 4, 2000 (JP) ........................................ 2000-267494

(51) Int. Cl.[7] .................................................. F16B 7/10
(52) U.S. Cl. .................................. 403/109.1; 248/188.5
(58) Field of Search .......................... 403/109.1, 109.5, 403/104, 377, 21, 22, 297, 248, 259, 60, 61; 248/188.5, 441.1, 447.2

(56) References Cited

U.S. PATENT DOCUMENTS

| 4,430,017 A | * | 2/1984 | Stefancich | ................. | 403/104 |
|---|---|---|---|---|---|
| 4,856,929 A | * | 8/1989 | Smahlik et al. | ............. | 403/297 |
| 5,069,570 A | * | 12/1991 | Pryor et al. | ................. | 403/109 |
| 5,197,349 A | * | 3/1993 | Herman | ...................... | 74/551.1 |
| 6,202,663 B1 | * | 3/2001 | Uemura | ....................... | 135/65 |

* cited by examiner

*Primary Examiner*—Lynne H. Browne
*Assistant Examiner*—Michael P Ferguson
(74) *Attorney, Agent, or Firm*—Ostrolenk, Faber, Gerb & Soffen LLP

(57) ABSTRACT

A pipe linkage between a larger diameter pipe and a smaller diameter pipe installed in the larger pipe. A compressible bush at the inserted end of the smaller pipe is compressed by a bolt and swollen to adhere in the smaller pipe and a larger diameter exposed collar on the bush will contact the interior of the larger pipe, precluding metal noise generation upon relative tilting of the pipes.

8 Claims, 6 Drawing Sheets

PIPE LINK WITH EXPANDABLE BUSHING

BACKGROUND OF THE INVENTION

This invention relates to a linkage useful, for example on a musical instrument stand, wherein a small-diameter pipe is inserted into a large-diameter pipe and the pipes are to be linked and maintained in such a fashion as to be freely capable of expansion and contraction of the linked pipes.

DESCRIPTION OF A PRIOR ART EMBODIMENT

In a known cymbal stand 50 shown in FIG. 5, for example, cymbals are supported at the top of a series of pipes. The pipes are ordinarily made of metal. They include an upper pipe 54, a middle pipe 53 and a lower pipe 52. The pipes are connected and held to be freely capable of elongation and contraction by each smaller diameter pipe being inserted into a larger-diameter pipe like the smaller middle pipe 53 in the larger bottom pipe 52, and the smallest upper pipe 54 in the smaller middle pipe 53.

A known linking connection between two of these pipes is shown in cross section in FIG. 6. It comprises a pipe linkage device 60 comprising a tightening bush 61 for holding, a main body 66 for holding and a tightening member 70. The tightening bush 61 is a tubular body, which is C-shape in transverse cross-section, including a cut (not shown). A small-diameter pipe 54 (or 53) is inserted into and held by the bush 61.

On one axial side, the main holding body 66 has a large-diameter tubular pipe insertion sleeve 67 for holding the outer periphery of the terminal part of the large-diameter pipe 53 (or 52). The other axial side of the body 66 includes a tubular tightening bush storage receptacle 68 for accommodating the tightening bush 61 enabling the small-diameter pipe 54 that has been inserted into and is held by the tightening bush 61 to run through the tightening bush storage part 68.

In this pipe linkage and holding device 60, the main holding body 66 is fitted to the outer periphery at the terminal end of the large-diameter pipe 53 and the tightening bush 61. The small-diameter pipe 54 runs through the bush 61 and is accommodated into the tightening bush storage receptacle 68 of the main holding body 66, resulting in one end of the small-diameter pipe 54 being inserted into the large-diameter pipe 53. When the tightening member 70 is thereafter tightened from outside of the main holding body 66, the small-diameter pipe 54 is in place.

When using such a linkage structure of the pipes, however, during a musical performance wherein cymbals 51 or tom-toms, etc. are installed above the cymbal stand 50 and are beaten violently, the free terminal part 54a on the linkage side of the small-diameter pipe 54 inside the large-diameter pipe 53 both rotates and shifts due to the vibrations, with the rotation having the linkage holding device 60 as its center. This causes a contact of the terminal part 54a with the inside of the large-diameter pipe 53, thereby producing unnecessary noise due to contact between the pipes.

To avoid such an inconvenience, it is possible to avoid the contact between the small-diameter pipe 54 in the large-diameter pipe 53 by increasing the diameter difference between the large-diameter pipe 53 and the small-diameter pipe 54. In this kind of stand construction, however, there are limits to the diameters of the pipes that are selected. If the large-diameter pipe 53 is used as the standard, the small-diameter pipe 54 becomes small in size, thereby making it look or be weak. If the small-diameter pipe 54 is used as the standard, on the other hand, the diameter of the large-diameter pipe 53 becomes larger, causing the outside appearance to become less appealing. In addition, an added problem develops in that the overall weight of the stand 50 becomes greater. Accordingly, it would be more desirable for the outside appearance if the difference in diameter between the large-diameter pipe 53 and the small-diameter pipe 54 is small.

SUMMARY OF THE INVENTION

An object of the invention is to provide a pipe linkage arrangement, by which a small-diameter pipe and a large-diameter pipe may be connected and held more firmly by using a simple structure, the pipes themselves being linked and held without shakiness, and undesired noise being effectively prevented during the performance.

The invention concerns a pipe linkage useful, for example, for a musical stand. The linkage comprises a bush installed at a terminal end on the linking side of a small-diameter pipe which is to be inserted into the inner tube of a large-diameter pipe. The bush is linked and maintained so as to be expanded or permitted to contract by a linkage holding device. The bush comprises a main body having an outer peripheral surface that can be inserted into the inner tube of the connected part of the small-diameter pipe. The bush has a large-diameter collar or part with an outer peripheral surface that can be inserted into the inner tube of the large-diameter pipe through a step which touches the edge of the terminal part on the linkage side of the small-diameter pipe. A bolt insertion hole that runs through the main body and the large-diameter collar receives a tightening bolt. A nut fixing receptacle on the terminal side of the main body of the bolt insertion hole receives a tightening nut for the bolt. A bolt installation seat for the tightening bolt is defined on the side terminal face of the large-diameter part of the insertion hole. As the tightening bolt is passed through the bolt insertion hole and is tightened into the tightening nut, the outer peripheral surface of the main bush body is compressively swollen while the bush may be installed inside the small-diameter pipe. At the same time, the contact of the small-diameter pipe with the interior of the large-diameter pipe is mitigated by the outer-peripheral surface of the large-diameter collar or part of the bush.

Often objects and features of the invention are explained below with reference to the attached drawings.

DESCRIPTION OF A PREFERRED EMBODIMENT

Figure 1:
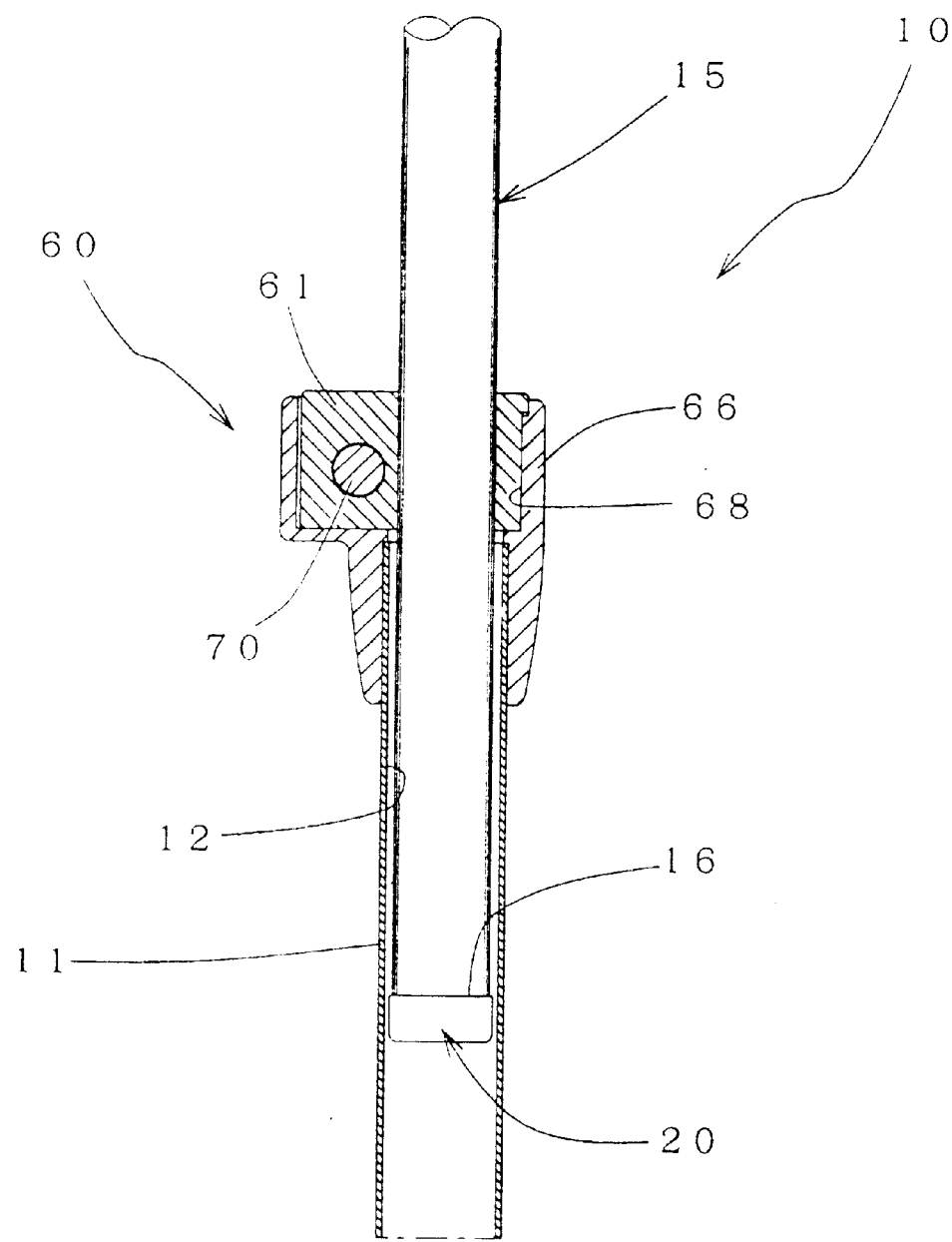
FIG. 1 is a partial cross-section showing an essential region of a musical stand including two pipes used in a support of the stand and showing the linkage between the pipes according to the invention.
Figure 5:
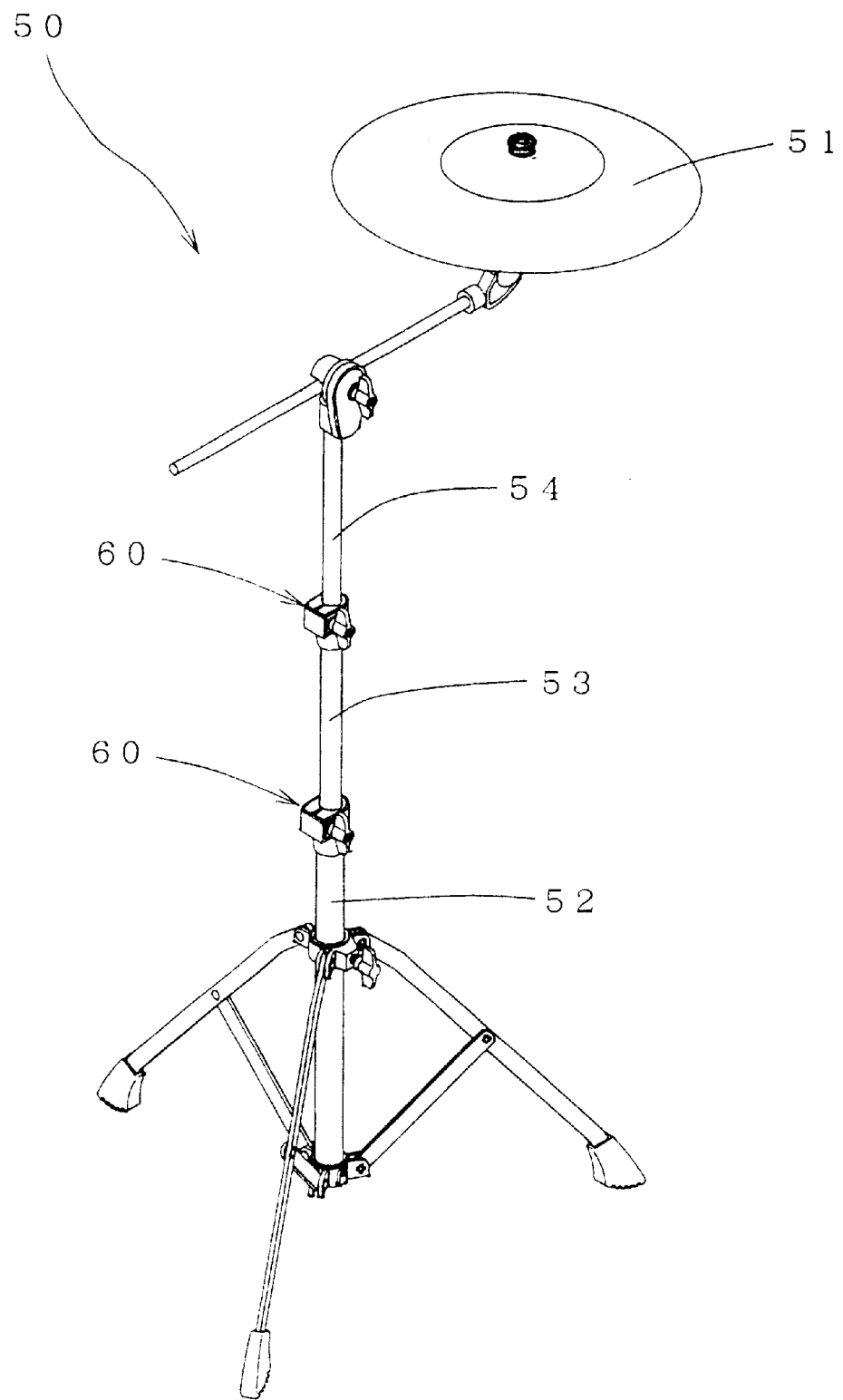
FIG. 5 shows an ordinary cymbal stand which may employ the invention.
Figure 6:
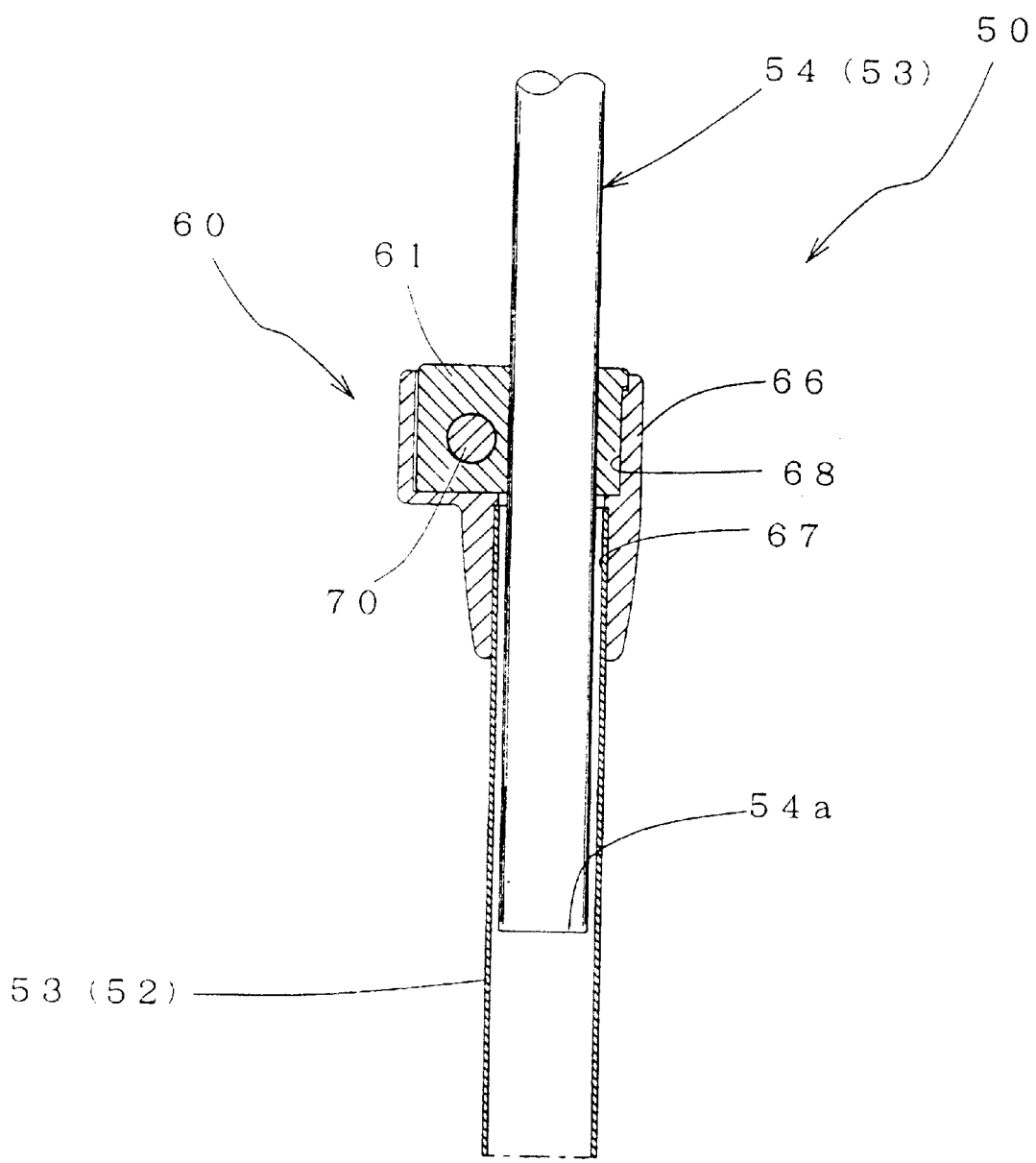
FIG. 6 is a partial cross section of the essential part of a pipe holding device according to prior art.

A pipe linkage part, particularly useful for the pipes which define together a musical stand, is shown in FIG. 1. A bush 20 is installed at a lower terminal end 16 on the linkage side of a small-diameter pipe 15 of the musical stand 10. That lower end and the bush are to be inserted into a tubular interior 12 of a large-diameter pipe 11. The pipe linkage is freely expandable and contractible by operation of a linkage holding device 60. The musical stand 10 in this example may comprise a stand 50 as shown in FIG. 5, which is shown as using prior art technology.

The linkage holding device 60 in the invention is now explained. In FIG. 1, those reference numbers which are the same as in FIG. 5 indicate the same members and their detailed explanations are not repeated.

Figure 2:
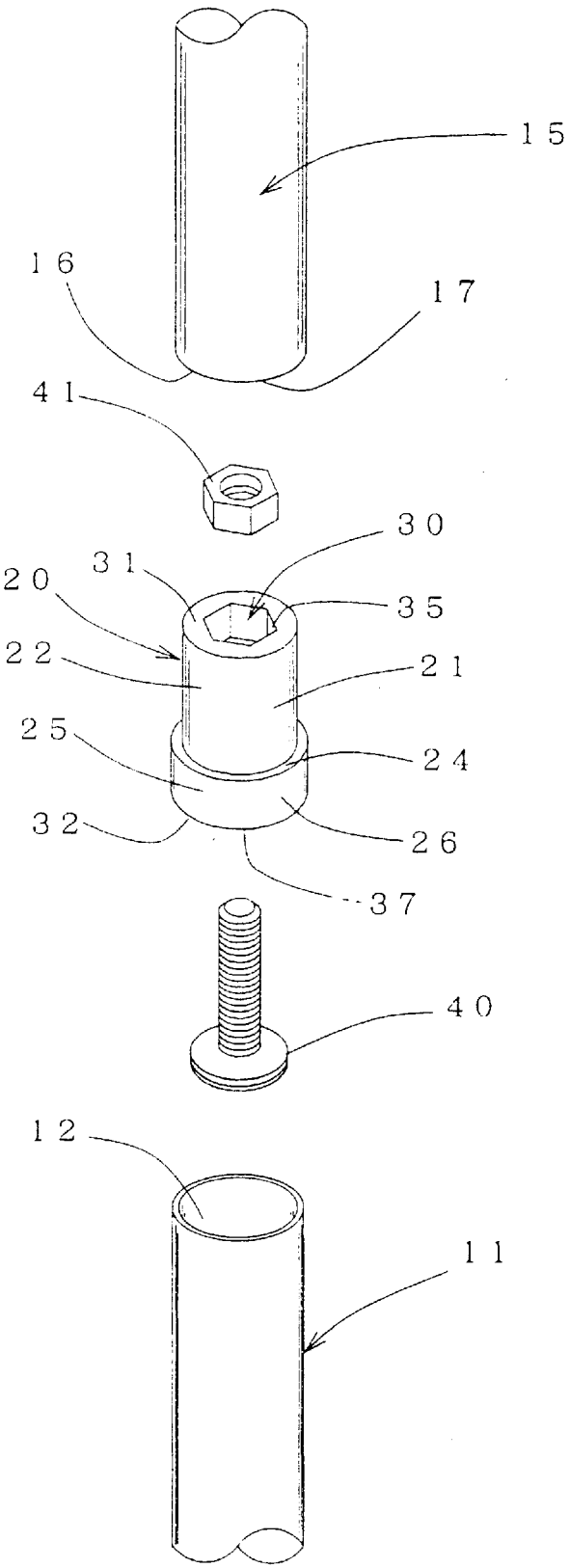
FIG. 2 is an oblique and exploded section of the elements of the pipe linkage of the invention.

In FIG. 2, the bush 20 is made of an elastic substance such as rubber or synthetic resin, etc. which can be freely deformed compressively. The bush comprises a main body 21, a large-diameter, usually lower, collar or part 25 with a diameter greater than the diameter of the main body 21. A bolt insertion hole 30 passes through the body 21.

The main body 21 of the bush 20 has an outer peripheral surface 22 which can be inserted into the tubular interior 17 (refer to FIGS. 3 and 4) of the lower terminal end region 16 on the linkage side of the small-diameter pipe 15 which is above the region 16. As the outer peripheral surface 22 of the body 21 is to be compressively adhered to the interior 17 of the small-diameter pipe 15, when the bush body 21 is compressed and swollen as will be described later, it is desirable that the diameter difference between the surface 22 and the interior 17 be as small as possible.

The large-diameter collar 25 of the bush 20 is separated from the surface 22 by a step 24 which contacts the terminal edge 18 at the terminal region 16 on the linkage side of the small-diameter pipe 15. The collar 25 has an outer peripheral surface 26 that can be inserted into the tubular interior of the large-diameter pipe 11.

The bolt insertion hole 30 passes through the main body 21 and its large-diameter collar 25.

The terminal region 31 on the main body side of the bolt insertion hole 30 of the bush 20 has a nut fixing receptacle (ordinarily a hexagonal hole) 35 for holding the tightening nut 41. The terminal region surface 32 on the large-diameter side of the bolt insertion hole 31 has a bolt installation seat 37 for seating the tightening bolt 40.

The tightening bolt 40 is inserted into the bolt insertion hole 30 through the bolt installation seat 37 of the bush 20 and is screwed into the nut 41 that has been fixed in the nut fixing receptacle 35. Tightening the bolt 40 compresses the bush 20 along the direction of the insertion hole 30 and causes it to swell outwardly.

Figure 3:
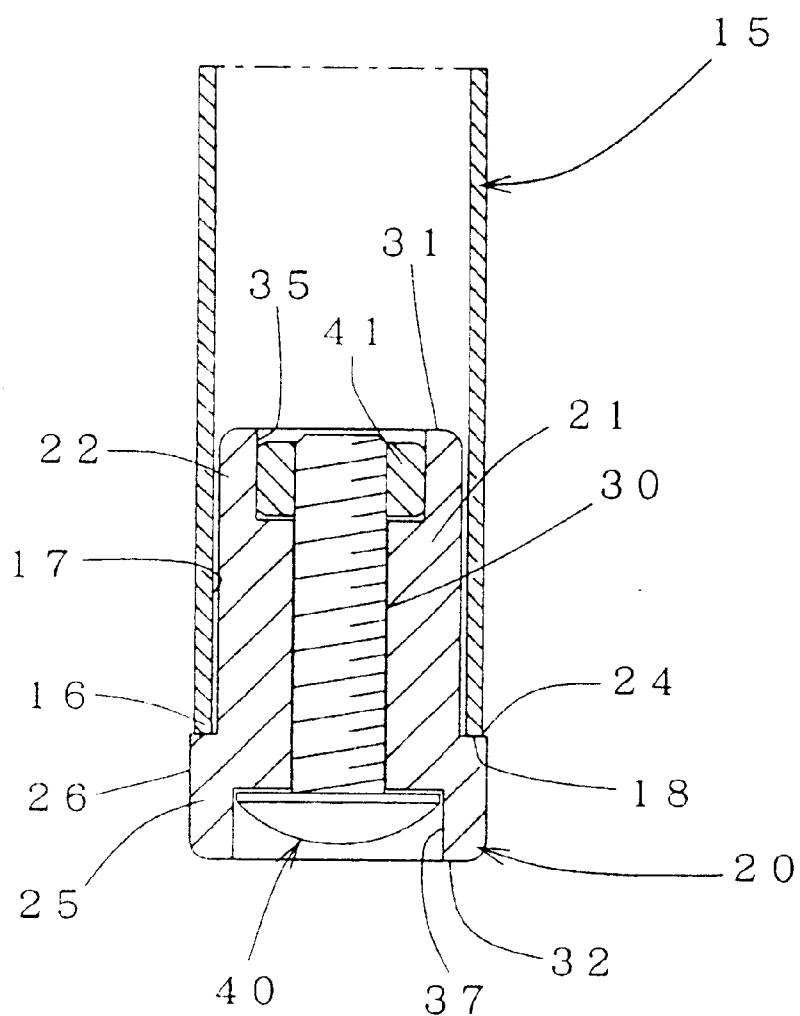
FIG. 3 is an elevational cross section of the essential part.

In FIG. 3, the main body 21 of the bush 20 is in the state where, subsequent to insertion of the tightening bush 61 of the pipe linking and holding device 60 at a selected location along the small-diameter pipe 15, the tightening bolt 40 is caused to run through the bush body 21, lightly fixing the bolt 40 and nut 41 so that they may not separate from one another or from the bush 20. Then the bush 20 is inserted into the interior 17 of the terminal region 16 on the linkage side of the small-diameter pipe 15, until the step 24 contacts the terminal edge of the terminal region 16 on the linkage side.

Figure 4:
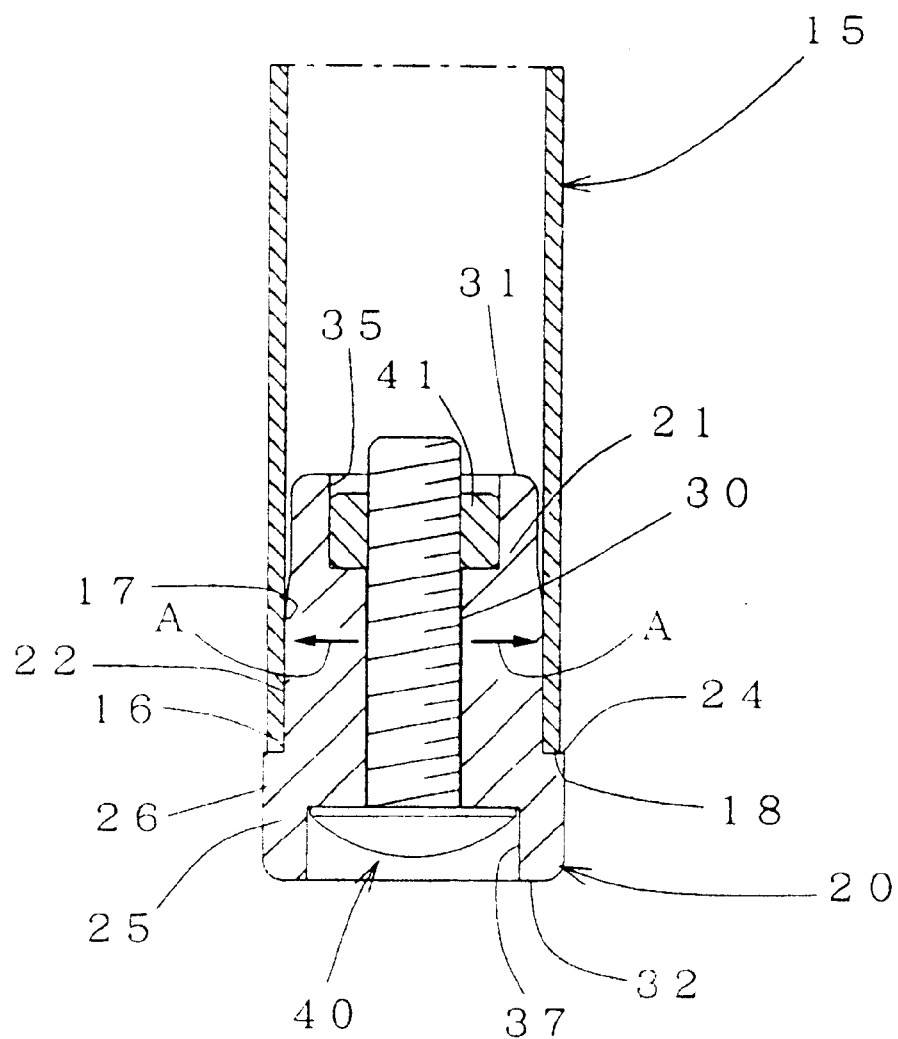
FIG. 4 is the same cross section of the linkage as in FIG. 3 showing the essential in an expanded condition.

Next, the tightening bolt 40 and the nut 41 are tightened when the bush 20 has been inserted into the terminal region 16 on the linkage side of the small-diameter pipe 15. This compressively deforms the outer peripheral surface 22 of the main bush body 21 to swell as seen in FIG. 4. As the outer diameter and outer peripheral surface 22 of the bush 20 is swollen out, as is shown by arrow A, the bush is firmly and tightly fixed in the small-diameter pipe 15.

The small-diameter pipe 15, with both the tightening bush 61 and the bush 20 mounted on it as described earlier, is inserted into the interior 12 of the large-diameter pipe 11. The main holding body 66 of the pipe linkage and holding device 60 is provided on the outer periphery of the upper terminal region of the outer pipe at the upper terminal end of the inner pipe. As a result, the tightening bush 61 for holding that has been installed on the small-diameter pipe 15 is accommodated in the tightening bush storage receptacle 68 of the main holding body 66.

If the bush 20 gets caught by the pipe linkage and holding device 60, this merely requires a slightly firmer push into it. As the tightening member 70 is thereafter tightened from outside the main holding body 66, the small-diameter pipe 15 will be clamped to and held, thereby completing the linkage between the large-diameter pipe 11 and the small-diameter pipe 15.

With this linkage structure, even if the small-diameter pipe 15 may swing right and left, the large-diameter collar part 25 of the bush 20, with its diameter larger than that of the small-diameter pipe 15, contacts the interior of the large-diameter pipe 11, both reducing the swinging motion and causing contact between the elastic body collar 25 and the pipe, rather than contact between the outer and inner pipes. Thus, no metallic sound will be generated that would adversely affect the performance.

Even if the small-diameter pipe 15 has been raised to the maximum limit height at the time of an adjustment of the height of the cymbal stand 10, the bush 20 will get caught by the pipe linkage and holding device 60 avoiding danger of erroneous slippage. The bush 20 can be easily taken out with a slightly stronger pull, when it is desired to dismantle the musical stand 10 for the purpose of carrying it or for maintenance work.

In the pipe linkage according to this invention, a bush can be installed inside the interior of a small-diameter pipe by the compressive swelling of the outer peripheral surface of the main bush body. A tightening bolt for the bush runs through the bolt insertion hole in the bush and is tightened in a tightening nut held at the main body. Further contact with the interior of the large-diameter pipe is done by the outer peripheral surface of the large-diameter collar of the elastic bush. This makes it possible to connect and hold the pipes without shaking and prevents a pipe contact noise from being generated during a performance.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A pipe linkage between a larger diameter pipe and a smaller diameter pipe, comprising:

the larger diameter pipe having a first tubular interior and a first terminal end region;

the smaller diameter pipe having a second tubular interior and a second terminal end region, the second terminal end region extends inside the first tubular interior of the larger diameter pipe; the second terminal end region terminates in a second terminal edge;

a linking holder connected to the larger and smaller diameter pipes for establishing the position of the smaller diameter pipe along the larger diameter pipe;

a bush having a main body with an outer peripheral surface wherein the bush is installed into the second interior of the smaller diameter pipe; the bush having a smaller diameter than the second interior of the smaller diameter pipe the bush having a collar with a diameter larger than the diameter of the outer peripheral surface of the main body and larger than a diameter of the second tubular interior of the smaller diameter pipe, defining a step between the outer peripheral surface of the main body and the collar for engaging the second terminal edge of the smaller diameter pipe to position the bush at the second terminal end region of the smaller diameter pipe so that the outer peripheral surface of the main body extends into the second interior of the smaller diameter pipe, the bush being comprised of compressible elastic material; and cooperating compression elements disposed at the bush, the compression elements being operable for compressing the bush for causing the outer peripheral surface of the main body of the bush to be swollen into contact with the second interior of the smaller diameter pipe, and the collar of the bush is so sized that upon swinging of the smaller diameter pipe inside the larger diameter tube, the collar on the bush may contact the interior of the larger diameter pipe, instead of the second terminal end region of the smaller diameter pipe making such contact.

2. The pipe linkage of claim 1, wherein the compression elements for the bush comprise a bolt that extends through the bush and a nut operable for being tightened on the bolt, the bolt and the nut being so positioned that tightening the nut on the bolt compresses the bush.

3. The pipe linkage of claim 2, wherein the nut is mounted to the bush at a distance from the second terminal end of the bush.

4. The pipe linkage of claim 3, further comprising a bolt insertion hole extending through the bush for insertion of the bolt through the insertion hole, so that the bolt has an end spaced from the second terminal end of the bush and cooperating with the nut.

5. The pipe linkage of claim 4, further comprising a nut holding receptacle provided in the bush at the distance from the second terminal end and receiving the nut, the receptacle being so shaped that the nut is received in the receptacle in a rotationally fixed manner as the nut is being tightened on the end of the bolt.

6. The pipe linkage of claim 1, wherein the linkage holder comprises:

a holding body disposed around the first terminal end region of the larger diameter pipe and around the smaller diameter pipe past the first terminal end region; and a tightening bush mounted on and located around the smaller diameter pipe and supported in the holding body, the tightening bush being operable for gripping the smaller diameter pipe to secure a position of the smaller and larger diameter pipes along each other.

7. A pipe linkage assembly, comprising:

a first pipe extending along an axis toward an inner axial end region having an inner rim, the first pipe having a first inner surface and an outer surface having an outer diameter;

a second pipe provided with a second inner surface having an inner diameter greater than the outer diameter of the first pipe such that when the inner axial end region of the first pipe is inserted into the second pipe, the first and second pipes are capable of swinging relative to one another;

a bush comprised of compressible elastic material and having:

a longitudinal main body having an inner edge and removably inserted into the first pipe along the inner axial end so that the first inner surface surrounds the main body, and a collar attached to the inner edge of the main body and extending radially outwardly from the main body to an outside of the collar, the collar abutting the inner rim of the first pipe when the main body is inserted into the first pipe and being sized so that when the inner axial end region of the fist pipe is inserted in the second pipe, the outside of the collar prevents contact between the second inner surface and the outer surface of the second pipe and the first pipe, respectively; and a compression element mounted in the bush and operable for compressing the bush so that the main body of the bush expands radially outwardly to have contact with the first inner surface of the first pipe.

8. A pipe link assembly, comprising:

a first pipe having a first inner surface and an outer surface provided with an outer diameter, the first pipe extending along an axis toward an inner rim thereof;

a second pipe provided with a second inner surface and having an inner diameter greater than the outer diameter of the first pipe so that when the first pipe is telescopically received in the second pipe, the first and second pipes are capable of swinging relative to one another;

a bush comprised of elastic material and having:

a main body mounted inside the first pipe, and a collar at an edge of the main body and extending radially outwardly from the main body toward a periphery of the collar so as to abut the inner rim of the first pipe, the collar being sized so that when the inner rim of the first pipe is received in the second pipe, the periphery of the collar terminates radially outward from the outer surface of the first pipe to prevent contact between the outer and inner surfaces of the first and second pipes, respectively; and a compression element mounted to the bush and operable for axially compressing the bush so that the main body of the bush expands radially outwardly to contact the first inner surface of the first pipe.

* * * * *